United States Patent
Myhre

(10) Patent No.: US 7,418,442 B1
(45) Date of Patent: Aug. 26, 2008

(54) INK ALTERNATES AND PLAIN TEXT SEARCH

(75) Inventor: Nathaniel Marvin Myhre, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 339 days.

(21) Appl. No.: 10/675,450

(22) Filed: Sep. 30, 2003

(51) Int. Cl.
*G06F 7/00* (2006.01)
*G06F 17/30* (2006.01)
*G06K 9/00* (2006.01)
*G06K 9/72* (2006.01)

(52) U.S. Cl. .............................. 707/3; 707/2; 382/187; 382/229

(58) Field of Classification Search ................ 707/2–4, 707/6; 382/186, 187, 229
See application file for complete search history.

(56) References Cited

U.S. PATENT DOCUMENTS 5,832,474 A * 11/1998 Lopresti et al. ................ 707/2
6,111,985 A * 8/2000 Hullender et al. ........... 382/229
6,785,417 B1 * 8/2004 Williamson et al. ......... 382/186
6,859,800 B1 * 2/2005 Roche et al. .................... 707/3

OTHER PUBLICATIONS

"Software Patent Institute Database of Software Technologies", http://www.spi.org/fmanual/d_oper2.htm#SAME.*
"Software Patent Institute Database of Software Technologies", Jan. 1997, http://www.spi.org/manual/d_oper2.htm.*

* cited by examiner

Primary Examiner—Mohammad Ali
Assistant Examiner—Chelcie Daye
(74) Attorney, Agent, or Firm—Merchant & Gould

(57) ABSTRACT

Providing the ability to search a document for content recorded as both ink characters and text characters. A character from a search query word is retrieved. A program retrieves the character in the electronic document. The program determines if the character in the electronic document is an ink or text character. For text characters, the character in the document content is compared to a character in the search query word to determine if the characters match. For ink characters, an ink alternate term is obtained. A character in the ink alternate is compared to the character of the search query word to determine if the characters match. Once all characters in the ink alternate word are compared, another ink alternate word is retrieved and compared to the search query word.

27 Claims, 13 Drawing Sheets

INK ALTERNATES AND PLAIN TEXT SEARCH

FIELD OF THE INVENTION

The present invention relates to the field of text searching within an electronic document, and more specifically to searching an electronic document containing ink and text data, wherein the ink data recognition generates multiple possible matches to the ink data.

BACKGROUND OF THE INVENTION

Electronic document editors are widely used in homes and businesses today. Familiar examples of these editors include word processing programs that operate on personal computers (PCs) and note-taking programs that operate on personal data assistants (PDAs). Some of these programs combine the attributes of word processing programs and note-taking programs by allowing a user to insert both ink and text data in the same document. These programs strive to replace paper as the simplest means to record and communicate information. However, to replace and enhance paper's utility, the electronic document editor must allow the user to search through documents containing both ink and text data so that a user can find information previously stored on the electronic documents.

While search methods for conventional word processing programs are well known in the art, the same cannot be said for search methods for note-taking programs containing ink data. Conventional note-taking programs have difficulty consistently recognizing ink data input by a user. Therefore, when the user attempts to search through the ink data, the search is only as successful as the ink recognition software of the note-taking program. In an effort to increase recognition of the ink data, conventional note-taking programs generate multiple possible matches for each ink word entered on a tablet.

While the generation of multiple possible matches improved the likelihood of matching the word entered onto the tablet by a user, problems related to searching still remained. First, many search programs only reviewed the first possible match to ink data when searching through an electronic document. These search programs were prone to missing the data the user was searching for when the search query was input. Additionally, some programs have attempted to generate documents covering each possible ink data match in order to conduct the search query. For example, if the program typically generated five possible matches for each word containing ink data, a document having one sentence that contained one word of ink data would generate five different sentences. Each sentence represents a different possible ink data match. While this method may be successful for documents containing one or two ink words, the number of permutations of the document grows, exponentially with each additional ink word in the document. Such growth would slow down the computer significantly to the point where search queries would be more hindrance than help.

Also, while conventional search programs have been created to, search electronic documents containing ink data or text data, no search program currently exists that can receive a search query from a user and search an electronic document containing both ink and text data.

In view of the foregoing, there is a need in the art for a single method to allow a user to search for terms in an electronic document containing either ink data, text data, or both. Furthermore, there is a need in the art for an improved method of searching electronic documents that contain multiple possible matches for ink data.

SUMMARY OF THE INVENTION

An ink alternates and plain text search provides a method for searching an electronic document that contains ink data, text data, or both. Ink data typically includes characters input into an electronic document with the use of a stylus, mouse, or other writing tool. Text data can include alphanumeric characters input into an electronic document via a keyboard, keypad, or voice recognition software. Characters, both ink and text, can include letters, numbers, punctuation, and symbols.

For one aspect of the present invention, the ink alternates and plain text search method can begin with a user inputting a search query into a document editing program. The search query typically contains words, letters, numbers, or phrases that the user would like to find in the document. The search query can contain boolean operators that can limit the number of matches generated by the search based on pre-designated requirements for each operator. For example, a user could enter the following search query, "good near day". In this example, the boolean operator is the word "near." In one exemplary embodiment, the boolean operator "near" will only find a match if the terms on each side of "near" are in the same paragraph. Boolean operators, used to narrow a search, can include "and," "or," and "near." Each boolean operator can impose a different limitation in the search.

The search method can retrieve the first character from the search query. In the example above the first character would be the letter "g." A character can also be retrieved from the electronic document that a user wishes to search. The electronic document can include multiple electronic documents and folders containing multiple electronic documents. The character retrieved from the electronic document can be either an ink character or a text character.

If the retrieved character is an ink character, recognition software may have generated ink alternate words containing ink alternate characters. For example, a user employs a stylus to write the word "win" in the electronic document. In an effort to ensure that the correct word is recognized, the recognition software can generate multiple options of what the software believes the word to be. Typically, each option is an actual word or number. In one exemplary embodiment, five ink "alternates" are generated for each ink word. Ink "alternates" for "win" could include "win," "won," "tin," "sin," and "gin." If generated in the order above, the first ink alternate character would be "w."

The search method can determine if the ink or text character matches the first character from the search query. Characters "match" if they are the same. However, differences in capitalization do not typically prevent a match from occurring. For example, "THE" and "the" are typically included as a match. If the first character in the document does not match the first character in the search query, the search method can move to the next character in the document to determine if that character matches the first character in the search query. When multiple ink alternate words are available, the search method typically goes through all of the characters of one ink alternate word before attempting to match with another ink alternate word.

If the ink or text character matches the first character in the search query, the search method usually compares the second character of the search query with the next character in the electronic document. A match is added to the match list when all of the characters in the search query between two spaces have been matched to consecutive ink characters, text characters, or a mix of ink and text characters. For example, a user types in the search query "good near day." A match can occur for "good" and "day". However, as discussed earlier, the matches may be removed from the match list at a later time due to the boolean operator "near."

For another aspect of the present invention, the search method can accept a search query. The search method can determine if the query matches one or more sets of characters in multiple electronic documents. If matches are found in the electronic document, the matches comprising the character sets can be added to a match list. The match list allows for the sorting of matches and assists in the determination of the matches that should be maintained after boolean operators and overlapping matches are evaluated. Once the match list is finalized, the matches can be highlighted in the electronic document and the nearest match can be displayed. The nearest match is typically determined in reference to the position of the cursor in the electronic document.

BRIEF DESCRIPTION OF DRAWINGS

For a more complete understanding of exemplary embodiments of the present invention and the advantages thereof, reference is now made to the following description in conjunction with the accompanying drawings in which.

DETAILED DESCRIPTION OF THE EXEMPLARY EMBODIMENTS

Figure 1:
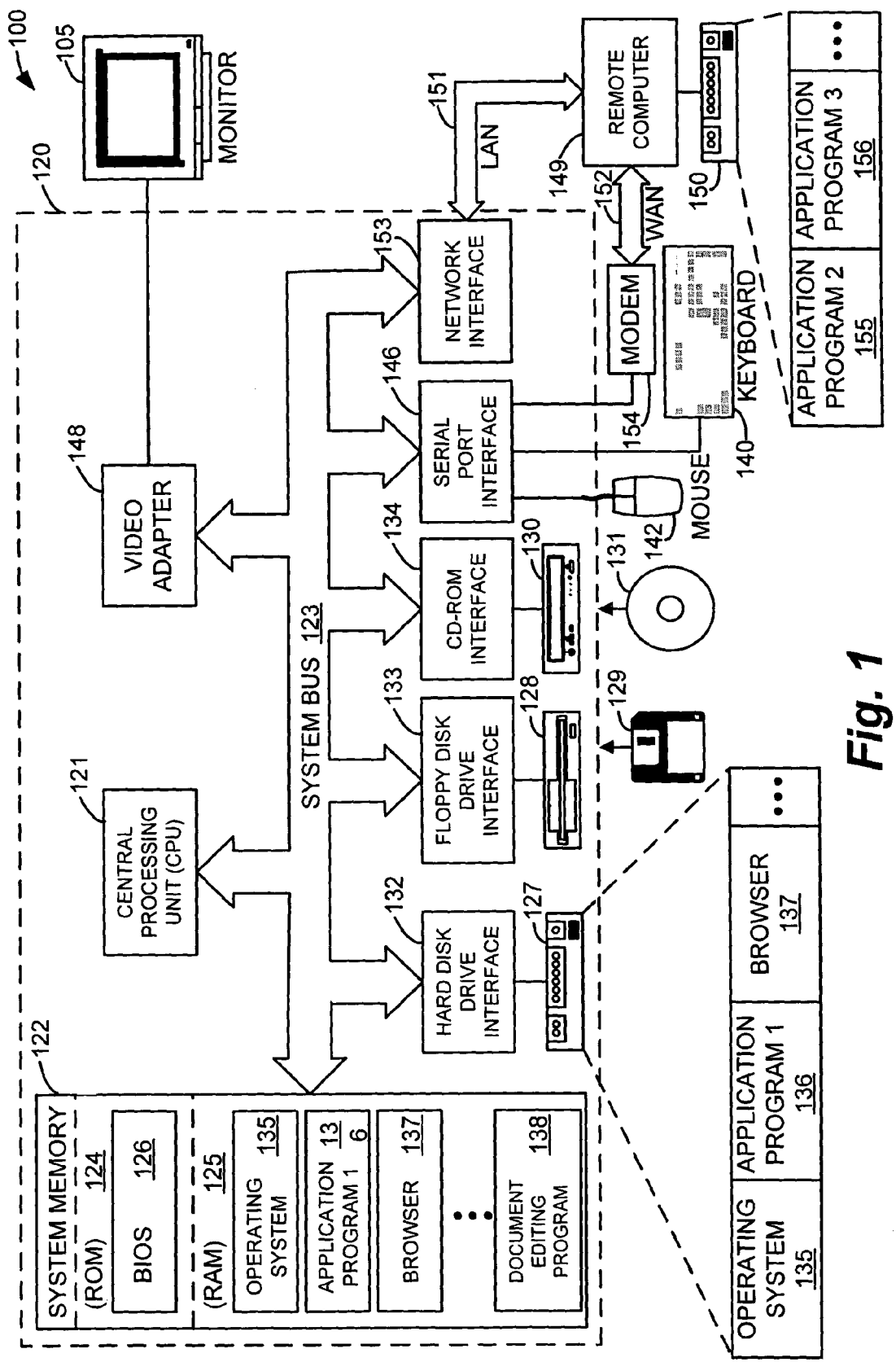
FIG. 1 is a block diagram illustrating an exemplary operating environment for implementation of various embodiments of the present invention.

The present invention supports a computer-implemented method and system for conducting ink and text searching in an electronic document. Exemplary embodiments of the invention can be more readily understood by reference to the accompanying figures.

Although exemplary embodiments of the present invention will be generally described in the context of a software module and an operating system running on a personal computer, those skilled in the art will recognize that the present invention can also be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description that follows is represented largely in terms of processes and symbolic representations of operations by conventional computer components, including processing units, memory storage devices, display devices, and input devices. These processes and operations may utilize conventional computer components in a distributed computing environment.

The processes and operations performed by the computer include the manipulation of signals by a processing unit or remote computer and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Exemplary embodiments of the present invention include a computer program that embodies the functions described herein and illustrated in the appended flowcharts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flowcharts and associated description in the program text, for example. Therefore, disclosure of a particular set of program code instructions is not considered necessary for an adequate understanding of how to make and use the present invention. The inventive functionality of the claimed computer program that will be explained in more detail in the following description is disclosed in conjunction with the remaining figures illustrating the program flow.

Referring now to the drawings, in which like numerals represent like elements throughout the several figures, aspects of the present invention and an exemplary operating environment for the implementation of the present invention will be described.

FIG. 1 is a block diagram illustrating an exemplary operating environment 100 for implementation of various embodiments of the present invention. Those skilled in the art will appreciate that FIG. 1 and the associated discussion are intended to provide a brief, general description of one exemplary embodiment of computer hardware and program modules, and that additional information is readily available in appropriate programming manuals, user's guides, and similar publications.

The exemplary operating environment 100 illustrated in FIG. 1 includes a general-purpose computing device that can be in the form of a conventional personal computer 120. As shown in FIG. 1, the personal computer 120 operates in a networked environment with logical connections to a remote server 149. The logical connections between the personal computer 120 and the remote server 149 are represented by a local area network 151 and a wide area network 152. Those of ordinary skill in the art will recognize that in this client/server configuration, the remote server 149 may function as a file server or computer server.

The personal computer 120 includes a processing unit 121, such as a "PENTIUM" microprocessor manufactured by Intel Corporation of Santa Clara, Calif. The personal computer also includes system memory 122, including read only memory (ROM) 124 and random access memory (RAM) 125, which is connected to the processor 121 by a system bus 123. An exemplary embodiment of the computer 120 utilizes a basic input/output system (BIOS) 126, which is stored in the ROM 124. Those skilled in the art will recognize that the BIOS 126 is a set of basic routines that helps to transfer information between elements of the personal computer 120. Those skilled in the art will also appreciate that the present invention may be implemented on computers having other architectures, such as computers that do not use a BIOS 126, and those that utilize other types of microprocessors for a processing unit 121.

Within the personal computer 120, a local hard disk drive 127 is connected to the system bus 123 via a hard disk drive interface 132. A floppy disk drive 128, which is used to read or write to a floppy disk 129, is connected to the system bus 123 via a floppy disk drive interface 133. A CD-ROM or DVD drive 130, which is used to read a CD-ROM or DVD disk 131, is connected to the system bus 123 via a CD-ROM or DVD interface 134.

A user can enter commands and information into the personal computer 120 by using input devices, such as a keyboard 140 and/or pointing device, such as a mouse 142, which are connected to the system bus 123 via a serial port interface 146. Other types of pointing devices (not shown in FIG. 1) include track pads, track balls, digitizer pens, head trackers, data gloves, and other devices suitable for positioning a cursor on a monitor 105. The monitor 105 or other kind of display device is connected to the system bus 123 via a video adapter 148.

As depicted in FIG. 1, a number of program modules can be stored on ROM 124, RAM 125, hard disk 127, floppy disk 129, or CD-ROM/DVD disk 131, such as an operating system 135, an application program module 136, a browser 137, and a document editing program module 138. Program modules typically include routines, sub-routines, programs, objects, components, data structures, etc., that perform particular tasks or implement particular abstract data types.

The remote server 149 in this networked environment is connected to a remote memory storage device 150. This remote memory storage device 150 is typically a large capacity device such as a hard disk drive, CD-ROM or DVD drive, magneto-optical drive or the like. Those skilled in the art will understand that program modules, such as an application program module 136, are provided to the remote server 149 via computer-readable media. The personal computer 120 is connected to the remote server 149 by a network interface 153, which is used to communicate over a local area network (LAN) 151'.

In some embodiments, the personal computer 120 is also connected to the remote server 149 by a modem 154, which is used to communicate over a wide area network (WAN) 152, such as the Internet. The modem 154 is connected to the system bus 123 via the serial port interface 146. The modem 154 also can be connected to the public switched telephone network (PSTN) or community antenna television (CATV) network. Although illustrated in FIG. 1 as external to the personal computer 120, those of ordinary skill in the art can recognize that the modem 154 may also be internal to the personal computer 120, thus communicating directly via the system bus 123. It is important to note that connection to the remote server 149 via both the LAN 151 and the WAN 152 is not required, but merely illustrates alternative methods of providing a communication path between the personal computer 120 and the remote server 149.

Those skilled in the art will appreciate that program modules, such as the operating system 135, the application program 136, the browser 137, and the document editing program module 138 can be provided to the personal computer 120 via computer-readable media. In exemplary embodiments of the operating environment 100, the computer-readable media can include the local or remote memory storage devices, which may include the local hard disk drive 127, floppy disk 129, CD-ROM/DVD 131, RAM 125, ROM 124, and the remote memory storage device 150. In some exemplary embodiments of the personal computer 120, the local hard disk drive 127 is used to store data and programs.

Although other elements of the personal computer 120 and the operating environment 100 in general are not shown, those of ordinary skill in the art will appreciate that such components and the interconnection between them are known. Accordingly, additional details concerning the elements of the personal computer 120 and the operating environment 100 in general need not be disclosed in connection with the present invention for it to be implemented by those of ordinary skill in the art.

Figure 2:
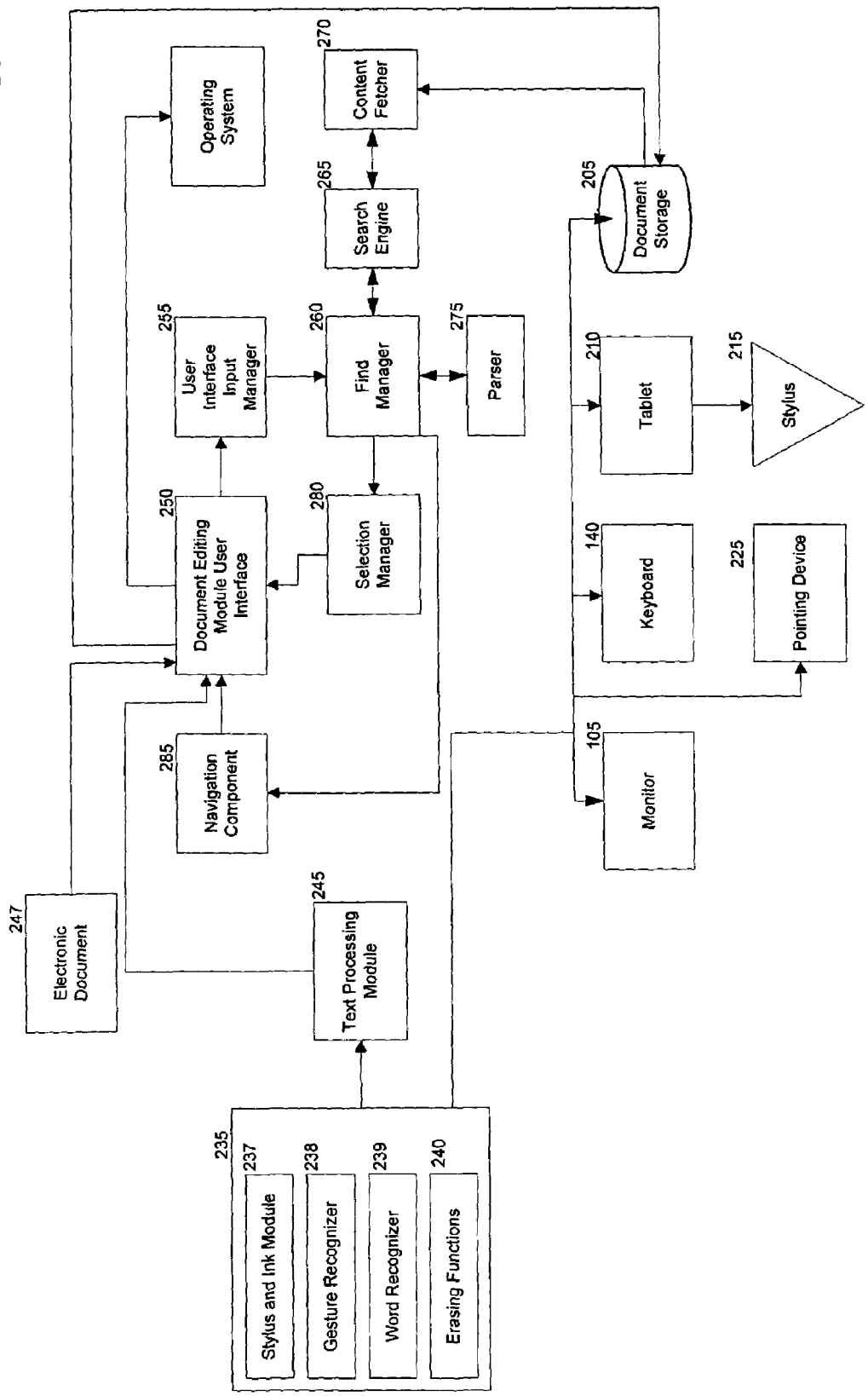
FIG. 2 is a block diagram of the primary functional components of an exemplary electronic document editor and related input devices.

FIG. 2 is a block diagram depicting the primary functional components of an exemplary electronic document editing program module 138 and related input devices for the representative operating environment of an electronic writing tablet, otherwise described as an electronic tablet. Specifically, FIG. 2 depicts an architecture 200 for an electronic writing tablet in the context of an electronic document editing program 138 constructed in accordance with an exemplary embodiment of the present invention. Conventional input devices are represented by the keyboard 140 and the pointing device 225 (e.g., mouse, trackball). Other output devices (not shown) can include a printer or speaker. Other hardware components shown in FIG. 2 include an electronic tablet 210 and an accompanying stylus 215. The tablet 210 and stylus 215 are used to input handwriting strokes that can be converted to data, referred to as electronic ink.

The electronic ink ("ink") may be incorporated into an electronic document 247 and may be displayed on either the electronic tablet 210, the monitor 105, or both. Although the electronic tablet 210 and the monitor 105 are illustrated as being distinct, in an exemplary embodiment of the present invention, they can be integrated into a single component. The joint tablet/monitor component has the ability to display information and receive input from the stylus 215. A conventional storage device is represented by the document storage 205. The document storage 205 represents a database capable of storing electronic documents 247 for retrieval by the electronic document editing program 138 of FIG. 1.

In the representative architecture 200, an ink-processing module 235 is operable to receive data from the electronic tablet 210 and to render that data as electronic ink. In one embodiment of the present invention, the ink-processing module 235 can be a collection of software modules that perform different tasks for rendering handwriting strokes as electronic ink. For example, the stylus and ink module 237 can receive data describing the positions and angles of the stylus for a series of handwriting strokes. The stylus and ink module 237 can interpret the data for rendering electronic ink. Other software modules, such as a gesture recognizer 238 and word recognizer 239 can be designed to identify certain handwriting strokes and assign them a particular significance. For example, certain gestures such as a cross-out may be recognized and associated with other editing processes. The ink-processing module 235 can also include an erasing functions module 240 for removing electronic ink that has been previously rendered.

Although ink processing modules are known in the art and necessary for an electronic tablet to function, a novel document editing program module 138 has been developed by Microsoft Corporation of Redmond, Wash. that capitalizes on the benefits of handwriting processing technology. The module (i.e., document editor) is a free-form document editor that leverages the functionality of electronic handwriting technology to enable more effective and efficient note taking. Specifically, document editing module user interface ("DEM UI") 250 facilitates manipulating electronic ink so that a user can create and modify an electronic document 247 with greater ease and sophistication. The DEM UI 250 typically comprises a collection of software modules for controlling, searching, and manipulating electronic ink and text rendered on the monitor 105. In one exemplary embodiment, ink represents data generated from handwritten strokes of the stylus 215 on the tablet 210, while text represents data generated through the use of the keyboard 220 pointing device 225 or a voice recognition system (not shown).

In an ink and text search query example the user interface input manager 255 can receive information entered into the electronic document 247 through the DEM UI 250. The user interface input manager 255 can pass this information to the find manager 260. The parser 275 can read the search query and reformat the query so that it can be understood by the search engine 265 and passes it back to the find manager 260. The parser 275 can also determine if the search query contains boolean operators, which may affect the determination of a match to the search query. The find manager 260 passes information to the search engine 265 about what information to search for and where to search for that information. The search engine 265 signals the content fetcher 270 to retrieve one or more documents to be searched. The search engine 265 searches the documents for terms entered into a search query and passes the results to the find manager 260. The find manager 260 determines the closest match from the search query and employs the navigation component 285 to scroll through the electronic document 247 until the page containing the closest match is reached. Then the find manager 260 can signal the selection manager 280 to select and highlight the closest match on the page.

Also, the DEM UI 250 can seamlessly integrate ink processing, performed by the ink processing module 235, with text processing, performed by a text processing module 245. The text processing module 245 can receive input from the keyboard 260 or a microphone coupled with a voice recognition software program (not shown) or other input device. This seamless integration allows a user a variety of ways to create and edit document objects using the electronic document editing program 138 of FIG. 1 and multiple input devices may be used to create or edit a single document object.

Figure 3:
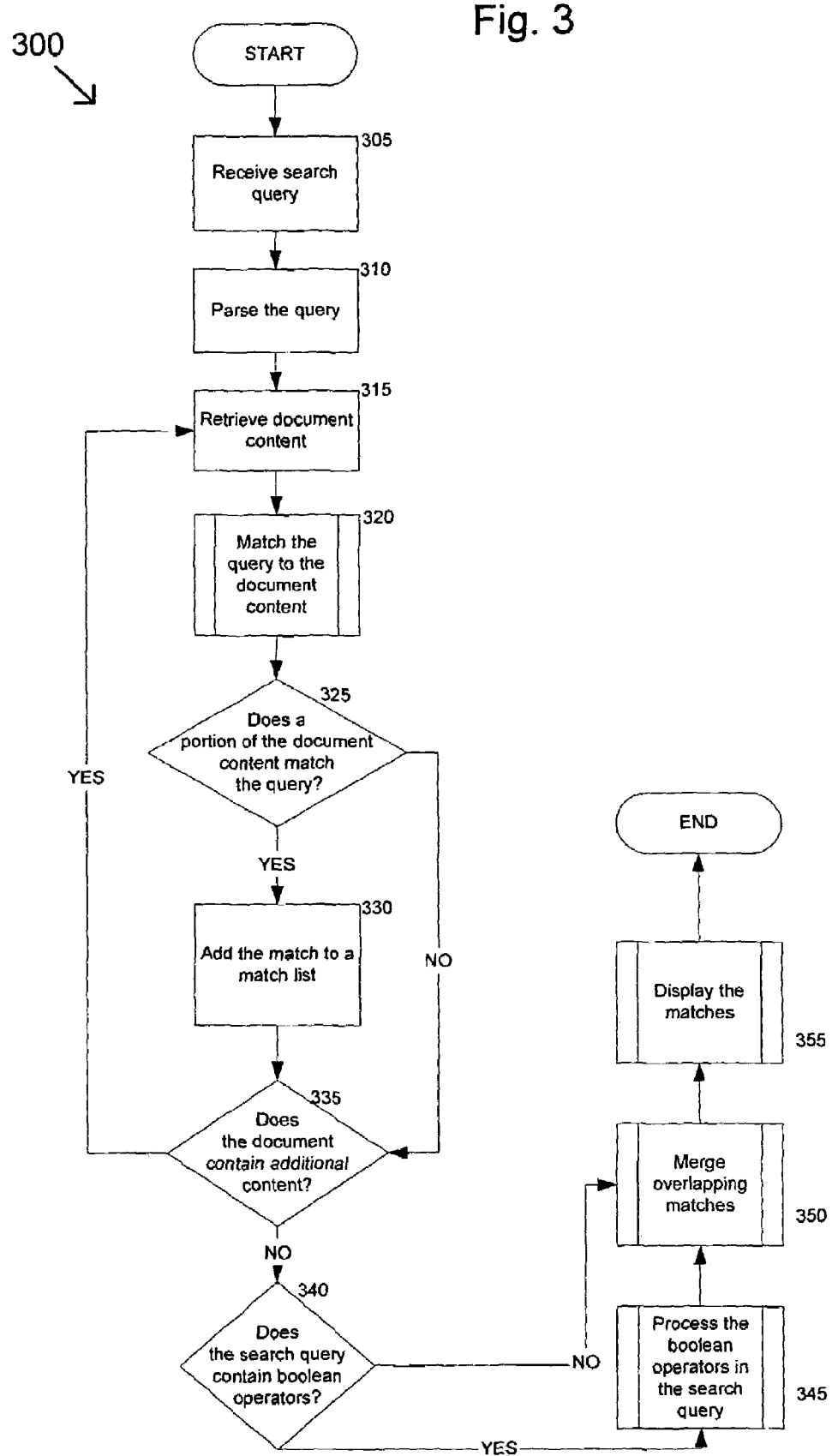
FIG. 3 is a flowchart illustrating an exemplary process for matching a search query to ink and text characters within an electronic document.

FIGS. 3-13 are logical flowchart diagrams illustrating the computer-implemented processes completed by exemplary methods for ink alternates and text searching based on a search query in an electronic document editing program 138. FIG. 3 is a logical flowchart diagram presented to illustrate the general steps of an exemplary process 300 for matching a search query to ink alternate and text characters within one or more electronic documents within the operating environment of the exemplary electronic document editor 200 of FIG. 2.

Now referring to FIGS. 1, 2, and 3, the exemplary method 300 begins at the START step and proceeds to step 305, in which the DEM UI 250 receives a search query. The search query can typically be described as a user searching for one or more terms within one or multiple documents. For example, a user may want to search for the term "patent" within a series of documents. The user can type "patent" into the DEM UI 250 and select "OK" from a pop-up box to begin the search. The search query is sent from the DEM UI 250 to the user interface input manager 255, which passes the query to the find manager 260.

In step 310, the search query is parsed by the parser 275. The parser 275 receives the search query from the find manager 260 and modifies the query into a format that the search engine 265 is capable of reading. Once the reformatting of the search query is complete, the parser 275 sends the search query back to the find manager 260. Next, the find manager 260 sends the reformatted query to the search engine 265.

Document content is retrieved by the content fetcher 270 from the document storage 205 in step 315. In one exemplary embodiment, the content fetcher 270 retrieves one paragraph from a document at a time from the document storage 205 and passes the paragraph to the search engine 265. In step 320, the search engine 265 attempts to find matches to the search query in the retrieved document content. In step 325, an inquiry is conducted to determine if a portion of the document content matches the search query. If so, then a match has occurred and the "YES" branch is followed to step 330, where the match is added to a match list in the search engine 265. If no portion of the document content matches the search query, then the "NO" branch is followed to step 335.

In step 335, an inquiry is conducted to determine if the current document being searched contains additional document content. A document contains additional document content if a portion of the document has not been searched for matches to the search query. If the document contains additional document content, the "YES" branch is followed to step 315, where the content fetcher 270 retrieves additional document content from the document storage 205. On the other hand, if no additional document content exists in the document, the "NO" branch is followed to step 340.

In step 340, an inquiry is conducted to determine if the search query contains boolean operators. Boolean operators assist the user to define the content that the user is searching for. The boolean operators can also assist the user in searching for multiple terms within a document, paragraph, or sentence. In one exemplary embodiment, boolean operators include the terms "and," "or," and "near." If the parser 275 determines that the search query contains boolean operators, the "YES" branch is followed to step 345, where the parser 275 processes the boolean operators in the search query. Otherwise, the "NO" branch is followed to step 350, where overlapping matches are merged by the search engine 265.

One example of an overlapping match is shown as follows. A user types in the following search query, "foo near bar." One document contains the terms "foo" and "bar" adjacent to each other. The matching process of step 320 will count this as two matches and place each match on the match list. However, the merging process of step 350 determines that these matches overlap and therefore the search engine will merge the two matches into one match. In step 365, the selection manager 280 determines the closest match to the current position of the cursor and sends the closest match to the DEM UI 250, where the match is displayed within the document content. The process 300 continues to the END step. The tasks completed in steps 320, 345, 350, and 355 are described in more detail below in connection with FIGS. 4, 6, 7, and 8.

Figure 4:
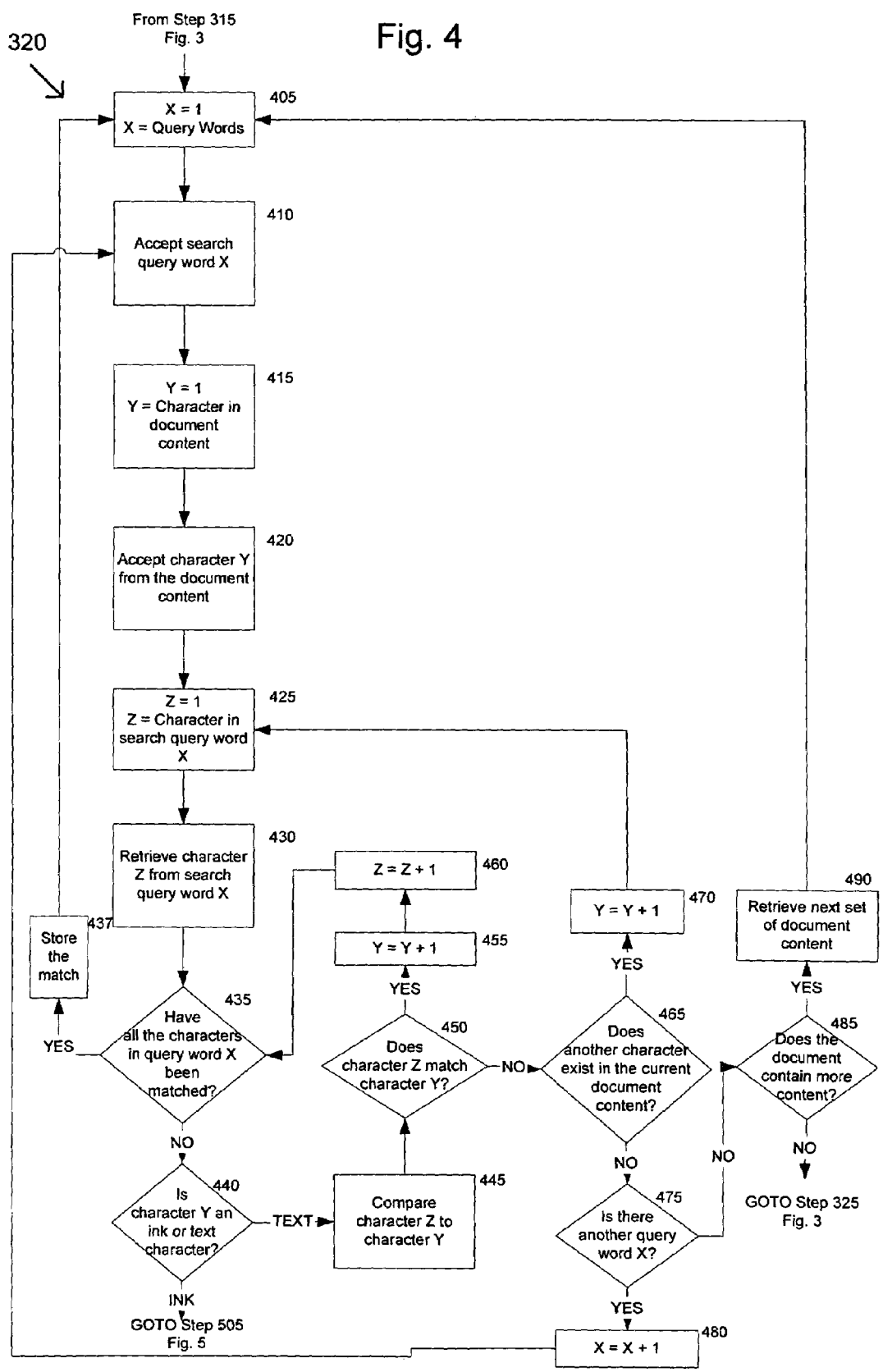
FIG. 4 is a flowchart illustrating an exemplary process for matching the search query to text characters within the electronic document.

FIG. 4 is a logical flowchart diagram illustrating an exemplary computer-implemented method for matching the search query to text characters within one or more documents being searched as completed by step 320 of FIG. 3. Referencing FIGS. 1, 2, and 4, the exemplary method 320 begins with the variable X being set equal to one in step 405. The variable X represents the words entered into the search query by the user. In one exemplary embodiment, the term "words" means one or more characters strung together, and does not necessarily mean terms found in the English language. In step 410, the first search query word is accepted into the search engine 265 from the find manager 260.

The variable Y is set equal to one in step 415. The variable Y represents each, character in the document content. Each character in the document content can be either ink or text. Additionally, a space between characters can also be considered a character. In step 420, the search engine 265 accepts the first character in the document content from the content fetcher 270. The variable Z is set equal to one in step 425. The variable Z represents each character in the search query word X. For example, if the search query word is "content" then the search query word contains seven characters.

In step 430, the search engine 265 retrieves the first character from the first search query word. In step 435, an inquiry is conducted to determine if all the characters in the first search query word have been matched to characters in the document content. If so, the "YES" branch is followed to step 437, where the match is stored in the search engine 265. Otherwise, the "NO" branch is followed to step 440. In step 440, an inquiry is conducted to determine if character Y in the document content is an ink character or a text character. If the character is an ink character, the "INK" branch is followed to step 505 of FIG. 5. On the other hand, if the character is a text character, the "TEXT" branch is followed to step 445.

In step 445, the text character is compared to the character in the search query word by the search engine 265. In step 450, an inquiry is conducted to determine if the text character in the document content matches the character in the search query. In one exemplary embodiment, a match occurs when the document content character and the search query word character are the same, without regard to capitalization. For example, if the search query word contains the character "t," document content characters "t" and "T" qualify as matches. Similarly, if the search query word contains the character "T," then document content characters "T" and "t" would qualify as matches.

If the characters do match, the "YES" branch is followed to step 455, where the variable Y is increased by one. In step 460, the variable Z is increased by one. The process returns to step 435 to determine if all the characters in the search query word have been matched. If the characters did not match in step 450, then the "NO" branch is followed to step 465. In step 465, an inquiry is conducted to determine if another character Y exists in the document content. If so, the "YES" branch is followed to step 470, where the variable Y is increased by one. The process then returns to step 425. If another character Y does not exist in the document content, the "NO" branch is followed to step 475.

In step 475, an inquiry is conducted to determine if the search query contains another query word X. If so, the "YES" branch is followed to step 480, where the variable X is increased by one. The process then returns to step 410. If no other query words are in the search query, the "NO" branch is followed to step 485, where an inquiry is conducted by the content fetcher 270 to determine if the current document contains additional document content. If so, the "YES" branch is followed to step 490, where the next set of document content is retrieved by the content fetcher 270 and sent to the search engine 265. In one exemplary embodiment, document content is retrieved from the document a paragraph at a time. However, document content can be retrieved from the document a character, a sentence, a paragraph, or a page at a time or the entire document can be retrieved prior to the matching process. Once additional document content is retrieved, the process returns to step 405. If the document does not contain additional document content, the "NO" branch is followed to step 325 of FIG. 3.

Figure 5:
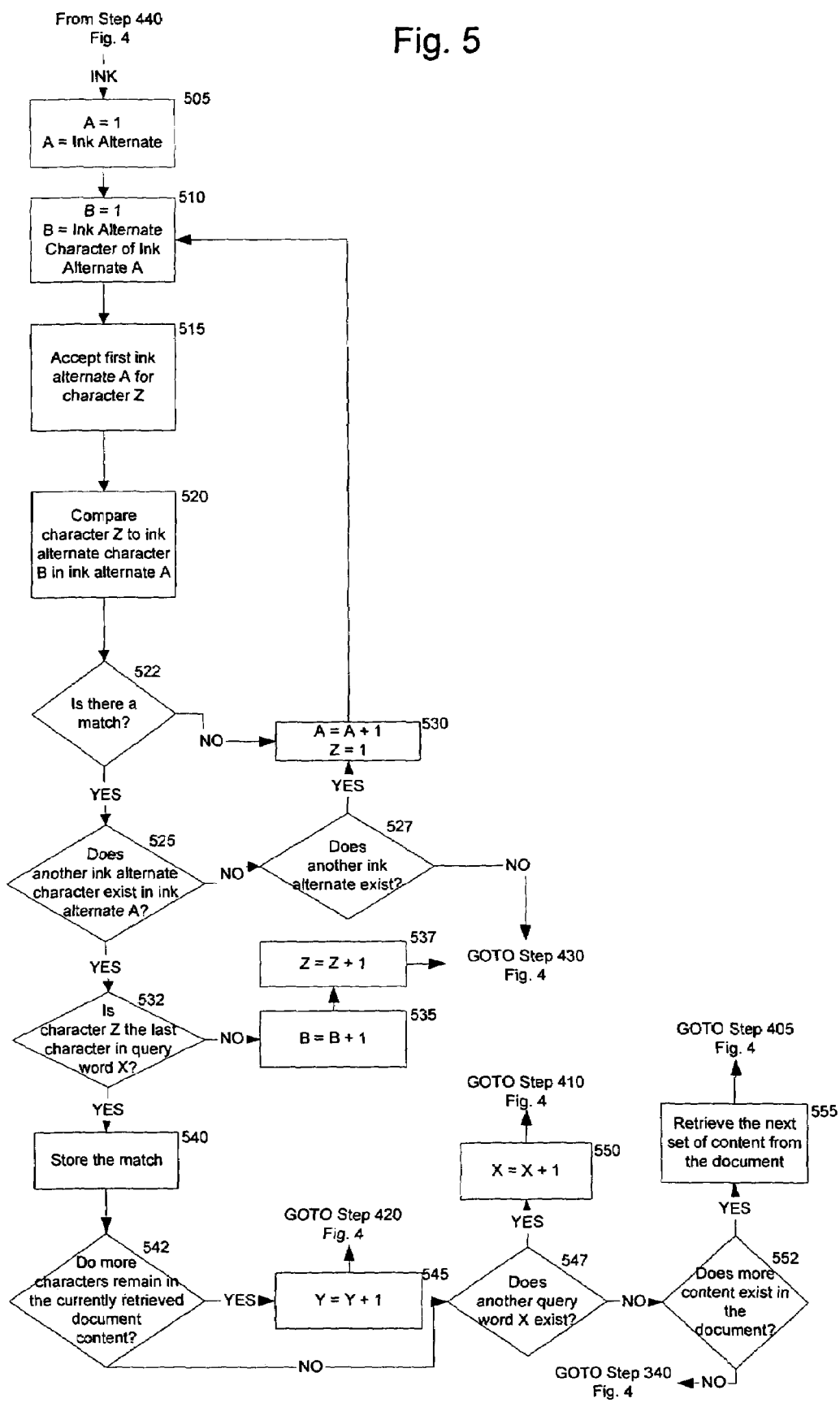
FIG. 5 is a flowchart illustrating an exemplary process for matching the search query to ink characters within the electronic document.

FIG. 5 is a logical flowchart diagram illustrating an exemplary computer-implemented method for matching the search query to ink characters within a document as completed by step 320 of FIG. 3. Referencing FIGS. 1, 2, 4, and 5, the exemplary method 320 continues with the "INK" branch being followed from Step 440 of FIG. 4 to step 505 of FIG. 5. In step 505, the variable A is set equal to one. The variable A represents an ink alternate word of the ink word in the document. One or more ink alternate words can be generated for each ink word in the document. Ink alternate words may be necessary to compensate for differing handwriting styles of users. For example, a user employs the stylus 215 to write the ink word "how" on the tablet 210. The program 200 generates a set of alternate words for the ink word written by the user. An example of ink alternate words for the ink word "how" might include "now," "cow," "how," "low," and "bow." Ink alternate words can be generated to increase the chance that the program 200 will determine the correct ink word entered by the user.

In step 510, the variable B is set equal to one. The variable B represents the characters in the ink alternate terms represented by A. In step 515, the search engine 265 accepts the first ink alternate term. The search engine 265 compares character Z, from one of the search query words, to character B of ink alternate word A. In step 522, an inquiry is conducted to determine if character Z matches character B. If not, the "NO" branch is followed to step 530, where the variable A is incremented by one and the variable Z returns to the value it held at step 505. The process then returns to step 510 for the selection of the next ink alternate word. However, if a match does exist, the "YES" branch is followed to step 525.

In step 525, an inquiry is conducted to determine if another ink alternate character B exists in ink alternate word A. If not, the "NO" branch is followed to step 527, where an inquiry is conducted to determine if another ink alternate word exists. If so, the "YES" branch is followed to step 530. Otherwise, the "NO" branch is followed to step 430 of FIG. 4. Returning to step 525, if another character B exists, the "YES" branch is followed to step 532, where an inquiry is conducted to determine if character Z is the last character in query word X. If not, the "NO" branch is followed to step 535, where the variable B is incremented by one. In step 537, the variable Z is incremented by one. The process continues to step 430 of FIG. 4. If character Z is the last character in query word X, the "YES" branch is followed to step 540, where the search engine stores the match.

In step 542, an inquiry is conducted to determine if additional characters Y remain in the document content. If so, the "YES" branch is followed to step 545, where the variable Y is incremented by one. The process returns to step 420 of FIG. 4. However, if no additional characters remain in the document content, the "NO" branch is followed to step 547, where an inquiry is conducted to determine if another query word exists in the search query. If so, the "YES" branch is followed to step 550, where the variable X is incremented by one. The process returns to step 410 of FIG. 4. Otherwise the "NO" branch is followed to step 552.

In step 552, an inquiry is conducted to determine if the document contains additional document content. If so, the "YES" branch is followed to step 555, where the content fetcher 270 retrieves the next set of document content. The process returns to step 405 of FIG. 4. If the document does not contain additional document content, the "NO" branch is followed to step 340 of FIG. 3

Figure 6:
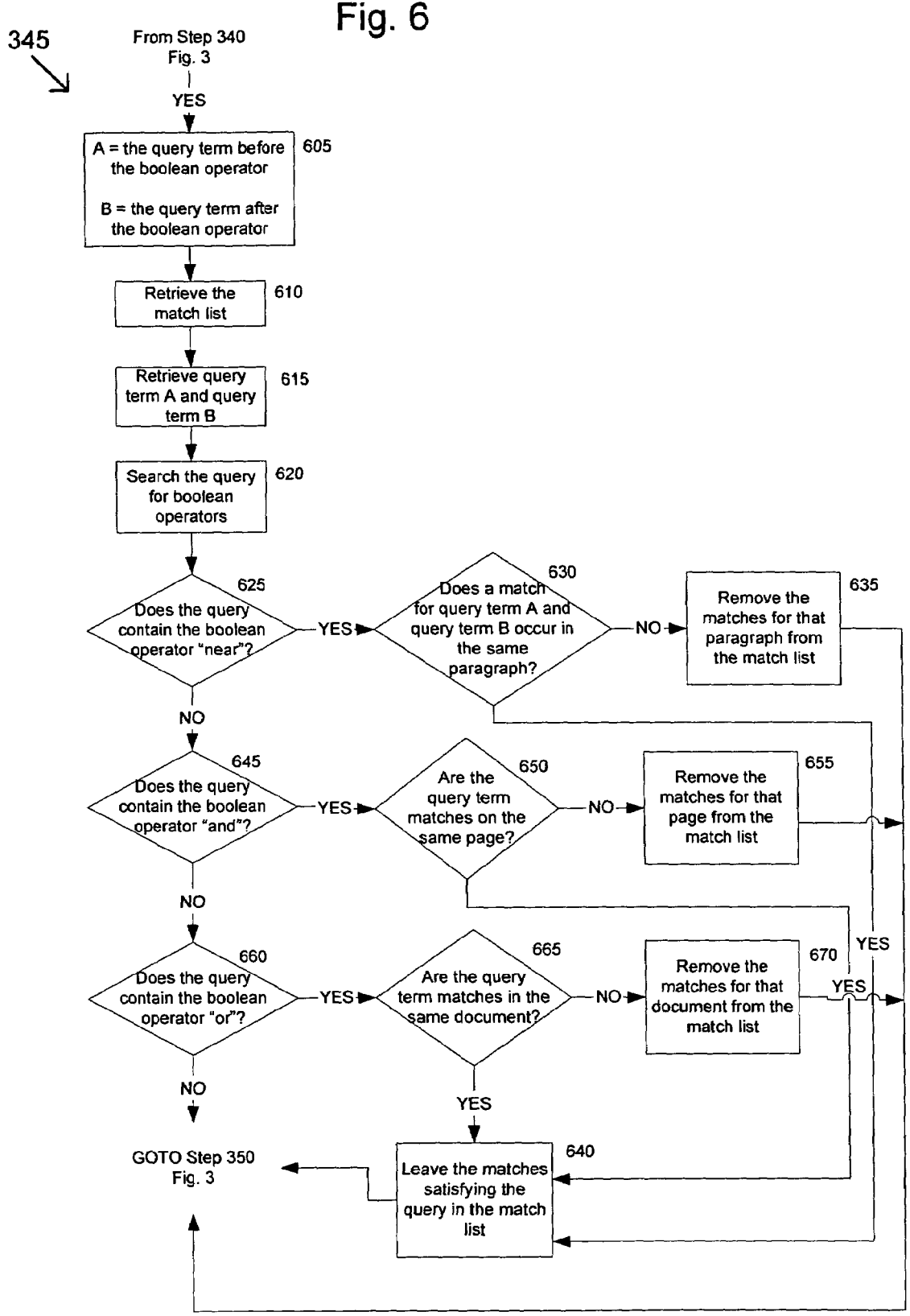
FIG. 6 is a flowchart illustrating an exemplary method for processing boolean operators within the search query.

FIG. 6 is a logical flowchart diagram illustrating an exemplary computer-implemented method for processing boolean operators within the search query as completed by step 345 of FIG. 3. Now referring to FIGS. 1, 2, and 6, the exemplary method 345 begins with the variable A being set as the search query word before the boolean operator and the variable B being set as the search query word after the boolean operator in step 605. In step 610, the parser 275 retrieves the match list from the search engine 265. The parser 275 retrieves word A and B from the search engine 265 in step 615. In step 620, the parser 275 searches the search query for boolean operators.

In step 625, an inquiry is conducted to determine if the search query contains the boolean operator "near". If so, the "YES" branch is followed to step 630. In step 630, an inquiry is conducted to determine if a match for query word A and query word B occurs within the same paragraph of the document. If so, the "YES" branch is followed to step 640, where matches for words A and B that are in the same paragraph are returned to the match list. Otherwise, the "NO" branch is followed to step 635, where matches for query words A and B that are not in the same paragraph are removed from the match list. The process continues to step 350 of FIG. 3. Returning to step 625, if the search query does not contain the boolean operator "near," the "NO" branch is followed to step 645.

In step 645, an inquiry is conducted to determine if the search query contains the boolean operator "and." If so, the "YES" branch is followed to step 650, where an inquiry is conducted to determine if the matches to query words A and B are on the same page of the document. If so, the "YES" branch is followed to step 640, where matches for query words A and B that are on the same page are returned to the match list. The process continues to step 350 of FIG. 3. If the matches are not on the same page, the "NO" branch is followed to step 655, where the matches for query words A and B that are not on the same page are removed from the match list. The process continues to step 350 of FIG. 3. Returning to step 645, if the search query does not contain the boolean operator "and," the "NO" branch is followed to step 660.

In step 660, an inquiry is conducted to determine if the search query contains the boolean operator "or." If so, the "YES" branch is followed to step 665, where an inquiry is conducted to determine if the matches to query words A and B are in the same document. If so, the "YES" branch is followed to step 640, where matches for query words A and B that are in the same document are returned to the match list.

The process continues to step 350 of FIG. 3. If the matches are not in the same document, the "NO" branch is followed to step 670, where the matches for query words A and B that are not in the same document are removed form the match list. The process continues to step 350 of FIG. 3.

Figure 7:
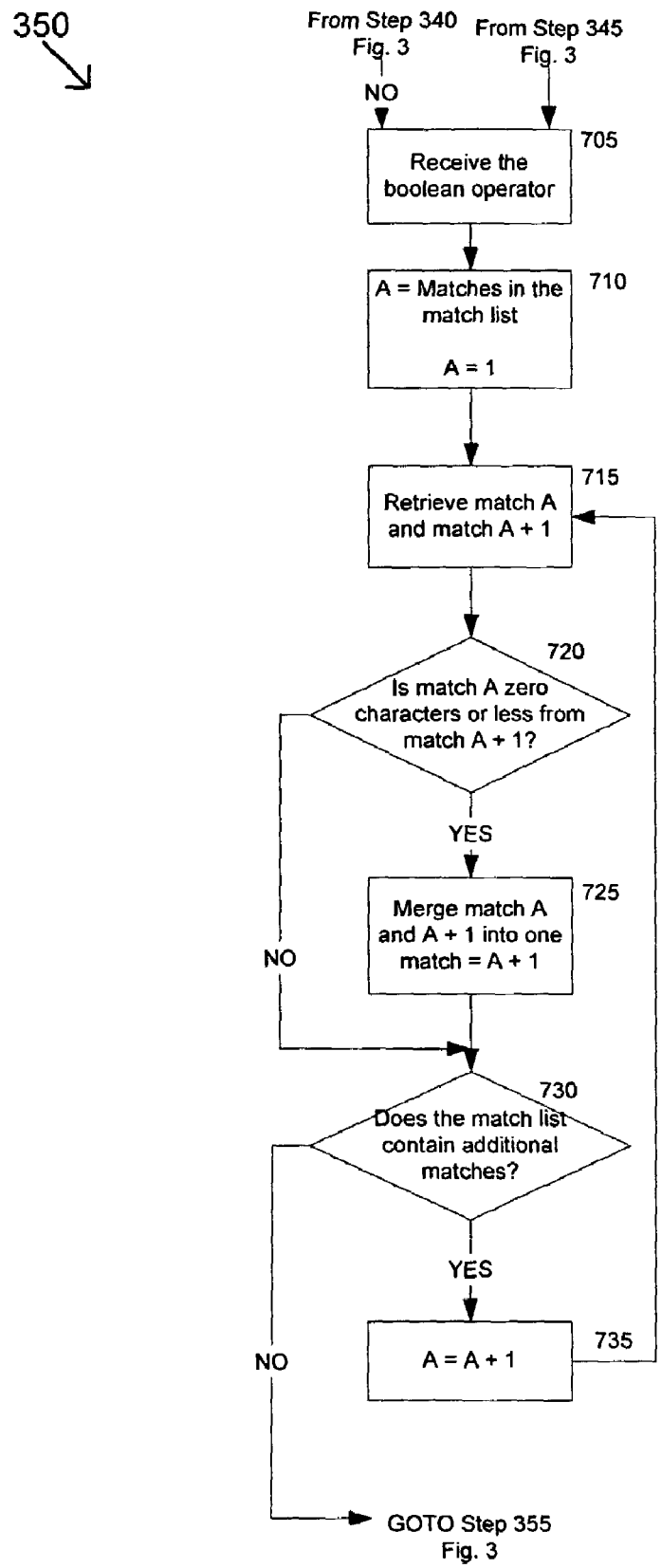
FIG. 7 is a flowchart illustrating an exemplary process for merging matches to the search query within the electronic document.

FIG. 7 is a logical flowchart diagram illustrating an exemplary computer-implemented method for merging matches in a match list as completed by step 350 of FIG. 3. Now referring to FIGS. 1, 2, and 7, the exemplary method 350 begins with the search engine 265 retrieving the boolean operators from the search query in step 705. In step 710, the variable A is set equal to one. The variable A represents a match in the match list. The search engine 265 retrieves match A and A+1 from the match list in step 715.

In step 720, an inquiry is conducted to determine if match A is zero characters or less from match A+1. If so, the "YES" branch is followed to step 725, where match A and A+1 are merged into 1 match in the match list and designated as A+1. Otherwise, the "NO" branch is followed to step 730, where an inquiry is conducted to determine if the match list contains additional matches. If so, the "YES" branch is followed to step 735, where the variable A is incremented by one. The process returns to step 715. If the match list does not contain additional matches, the "NO" branch is followed to step 355 of FIG. 3.

Figure 8:
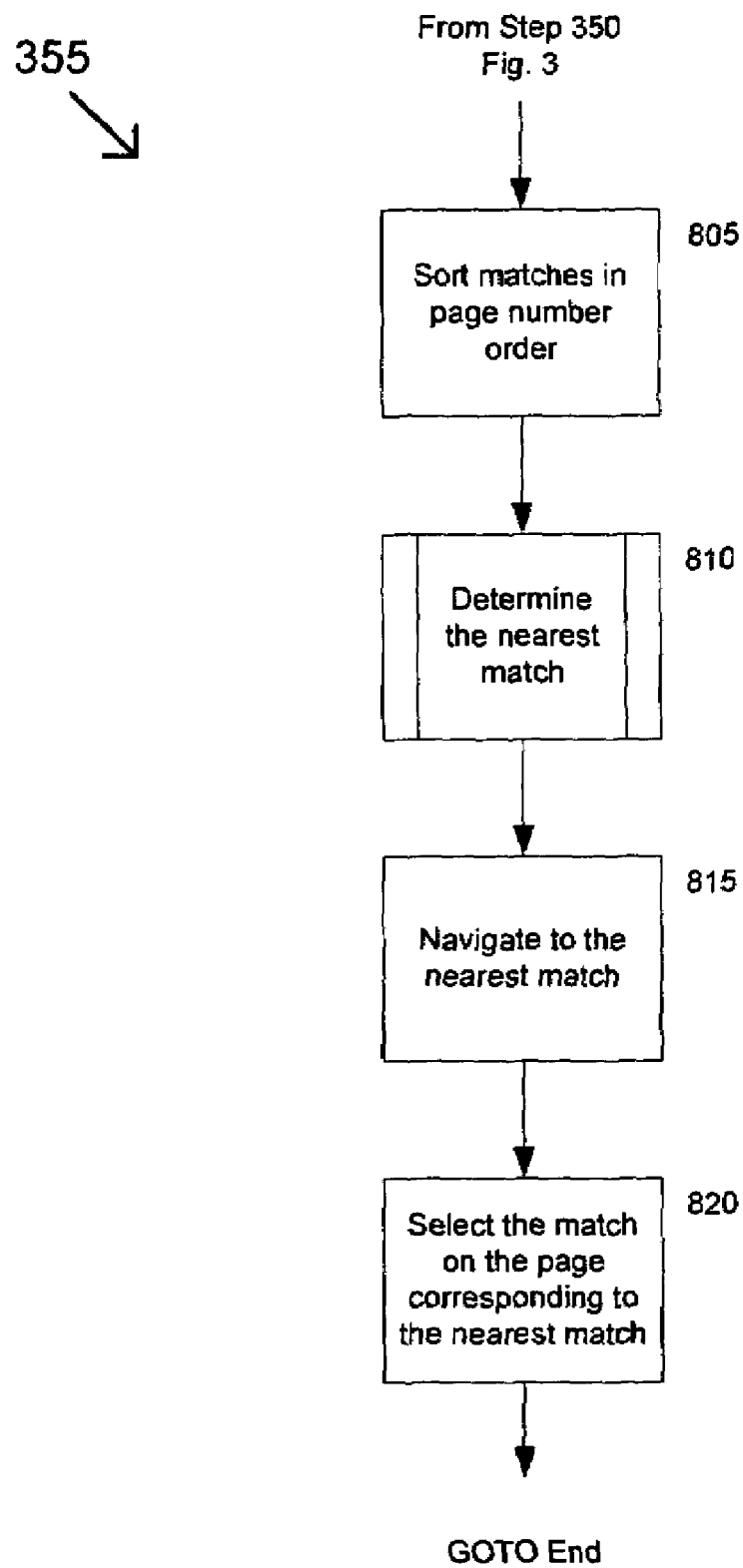
FIG. 8 is a flowchart illustrating an exemplary process for displaying matches to the search query within the electronic document.

FIG. 8 is a logical flowchart diagram illustrating an exemplary computer-implemented method for displaying matches to the search query as completed by step 355 of FIG. 3. Referencing FIGS. 1, 2, and 8, the exemplary method 355 begins with the find manager 260 sorting the matches in the match list in page number order in step 805. In step 810, the navigation component 285 determines which match is closest to the cursor location. In step 815, the navigation component 285 directs the DEM UI 250 to navigate to the page of the electronic document 247 containing the match nearest to the cursor location. The selection manager 280 instructs the DEM UI 250 to display the closest match to the cursor on the page selected by the navigation component 285. The process continues to the END step. The task completed in step 810 is described in more detail below in connection with FIG. 9.

Figure 9:
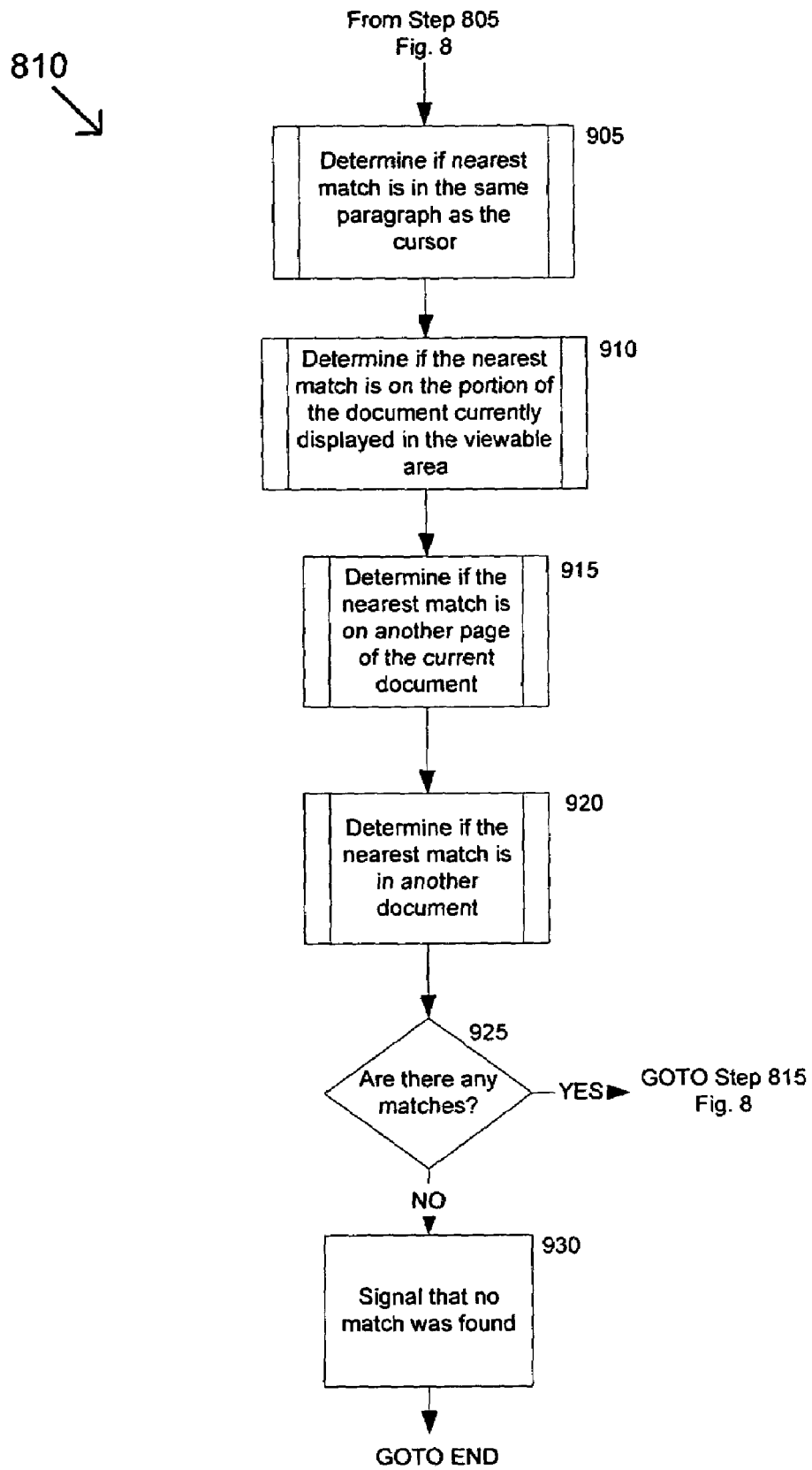
FIG. 9 is a flowchart illustrating an exemplary process for determining the nearest match to the current location of the cursor within the electronic document.

FIG. 9 is a logical flowchart diagram illustrating an exemplary computer-implemented method for determining the nearest match in a match list to the current location of a cursor within the document as completed by step 810 of FIG. 8. Now referring to FIGS. 1, 2, and 9, the exemplary method 810 begins with the find manager 260 determining if the nearest match to the location of the cursor is in the same paragraph as the cursor in step 905. In step 910, the find manager 260 determines if the match nearest to the location of the cursor is located on the portion of the document currently displayed in the viewable area of the monitor 105.

The find manager 260 determines if the nearest match to the location of the cursor is on another page of the current document in step 915. In step 920, the find manager 260 determines if the nearest match to the location of the cursor is in another document. In step 925, an inquiry is conducted to determine if any matches exist within the documents selected to be searched. If so, the "YES" branch is followed to step 815 of FIG. 8. Otherwise, the "NO" branch is followed to step 930, where the DEM UI 250 signals to the user that no match was found. The process continues to the END step of FIG. 3. The tasks completed in steps 905, 910, 915, and 920 are described in more detail below in connection with FIGS. 10, 11, 12, and 13.

Figure 10:
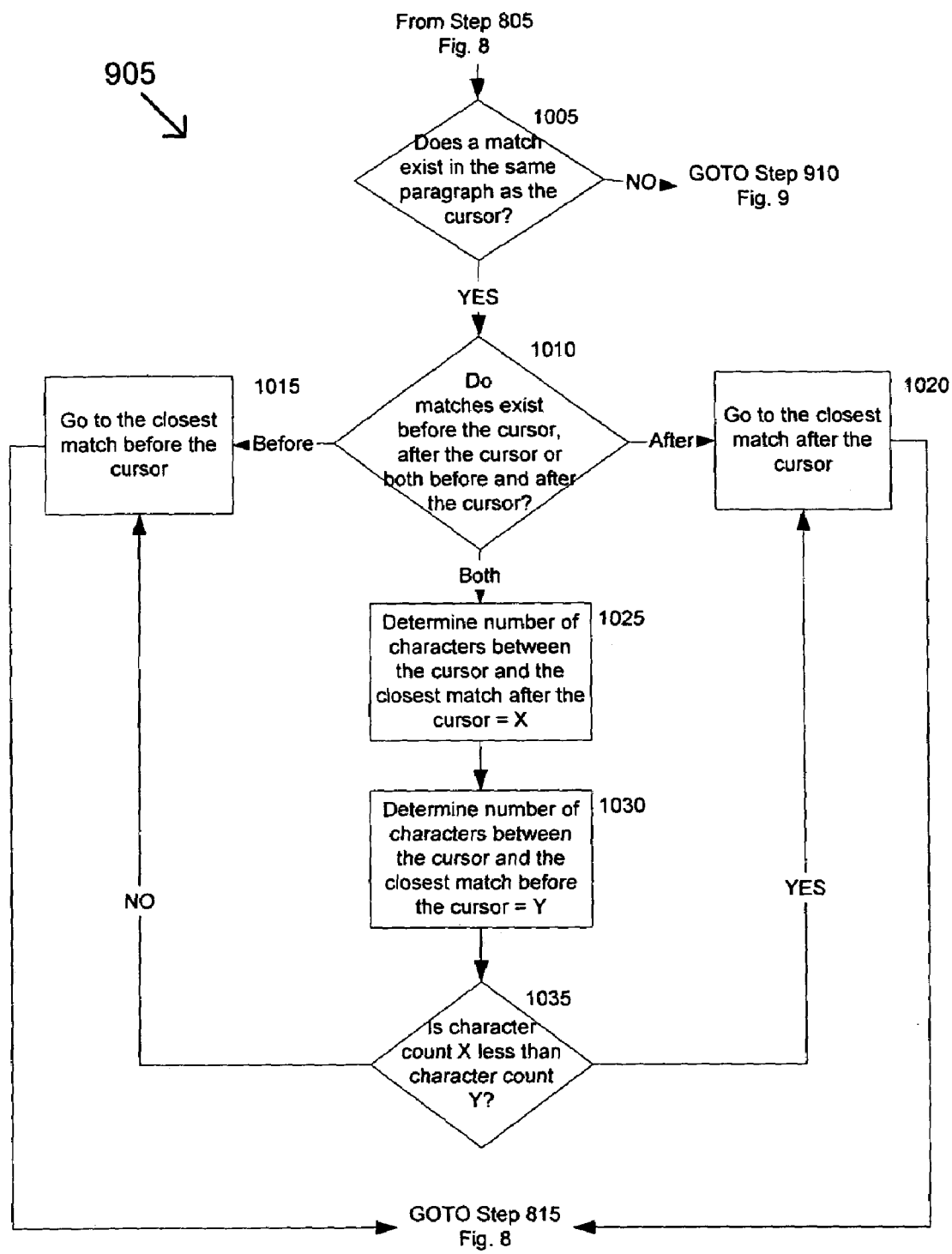
FIG. 10 is a flowchart illustrating an exemplary process for determining the nearest match to the cursor when multiple matches are located within the same paragraph as the cursor.

FIG. 10 is a logical flowchart diagram illustrating an exemplary computer-implemented method for determining the nearest match to a cursor when multiple matches are located within the same paragraph as the cursor, as completed by step 905 of FIG. 9. Referencing FIGS. 1, 2, 9, and 10, the exemplary method 905 begins with an inquiry to determine if a match in the match list exists in the same paragraph as the cursor in step 1005. If not, the "NO" branch is followed to step 910 of FIG. 9. Otherwise, the "YES" branch is followed to step 1010.

In step 1010, an inquiry is conducted to determine if matches in the same paragraph as the cursor occur before the cursor, after the cursor, or both. If matches only occur before the cursor, the "Before" branch is followed to step 1015, where the navigation component 285 directs the DEM UI 250 to the closest match located in the same paragraph and before the cursor. The process continues to step 815 of FIG. 8. If matches in the same paragraph as the cursor only occur after the cursor, then the "After" branch is followed to step 1020, where the navigation component 285 directs the DEM UI 250 to the closest match located in the same paragraph and after the cursor. The process continues to step 815 of FIG. 8. If the matches in the same paragraph as the cursor occur both before and after the cursor, the "Both" branch is followed to step 1025.

In step 1025, the find manager 260 determines the number of characters between the cursor and the closest match after the cursor, which is set equal to X. The find manager 260 determines the number of characters between the cursor and the closest match before the cursor, which is set equal to Y in step 1030. In step 1035, an inquiry is conducted to determine if the character count for X is less than the character count for Y. If so, the "YES" branch is followed to step 1020, where the navigation component 285 directs the DEM UI 250 to the closest match after the cursor. Otherwise, the "NO" branch is followed to step 1015, where the navigation component 285 directs the DEM UI 250 to the closest match before the cursor.

Figure 11:
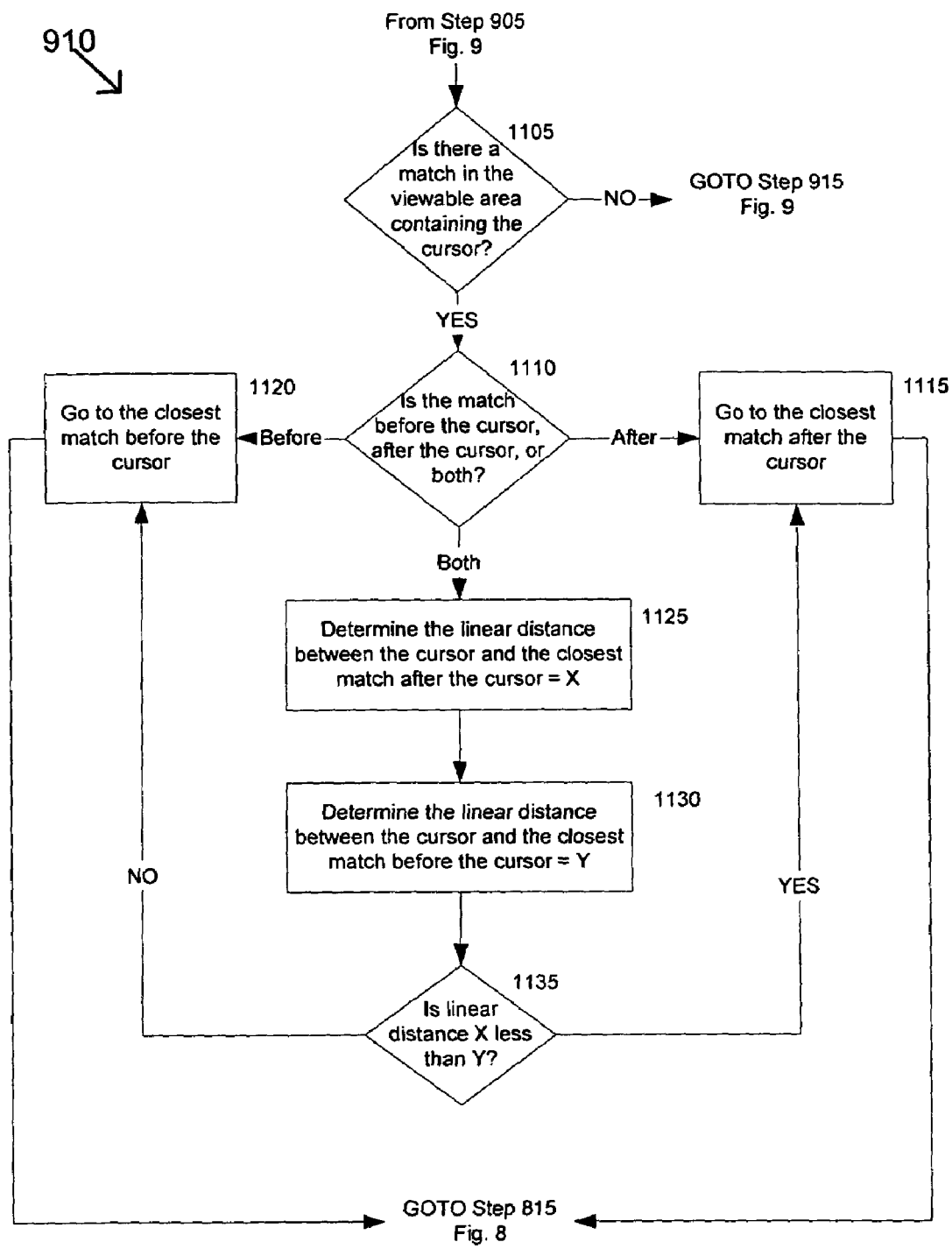
FIG. 11 is a flowchart illustrating an exemplary process for determining the nearest match to the cursor when multiple matches are located within the viewable area of the electronic document.

FIG. 11 is a logical flowchart diagram illustrating an exemplary computer-implemented method for determining the nearest match to a cursor when multiple matches are located within the viewable area of the monitor 105 as completed by step 910 of FIG. 9. Referencing FIGS. 1, 2, 9, and 11, the exemplary method 910 begins with an inquiry to determine if a match in the match list exists in the viewable area containing the cursor in step 1105. If not, the "NO" branch is followed to step 915 of FIG. 9. Otherwise, the "YES" branch is followed to step 1110.

In step 1110, an inquiry is conducted to determine if matches in the viewable area of the cursor occur before the cursor, after the cursor, or both. If matches only occur before the cursor, the "Before" branch is followed to step 1120, where the navigation component 285 directs the DEM UI 250 to the closest match located in the viewable area and before the cursor. The process continues to step 815 of FIG. 8. If matches in the viewable area of the monitor 105 only occur after the cursor, then the "After" branch is followed to step 1115, where the navigation component 285 directs the DEM UI 250 to the closest match located in the viewable area and after the cursor. The process continues to step 815 of FIG. 8. If the matches in the same viewable area as the cursor occur both before and after the cursor, the "Both" branch is followed to step 1125.

In step 1125, the find manager 260 determines the linear distance between the cursor and the closest match after the cursor, which is set equal to X. The find manager 260 determines the linear distance between the cursor and the closest match before the cursor, which is set equal to Y in step 1130. In step 1135, an inquiry is conducted to determine if the linear distance for X is less than the linear distance for Y. If so, the "YES" branch is followed to step 1115, where the navigation component 285 directs the DEM UI 250 to the closest match after the cursor. Otherwise, the "NO" branch is followed to step 1120, where the navigation component 285 directs the DEM UI 250 to the closest match before the cursor.

Figure 12:
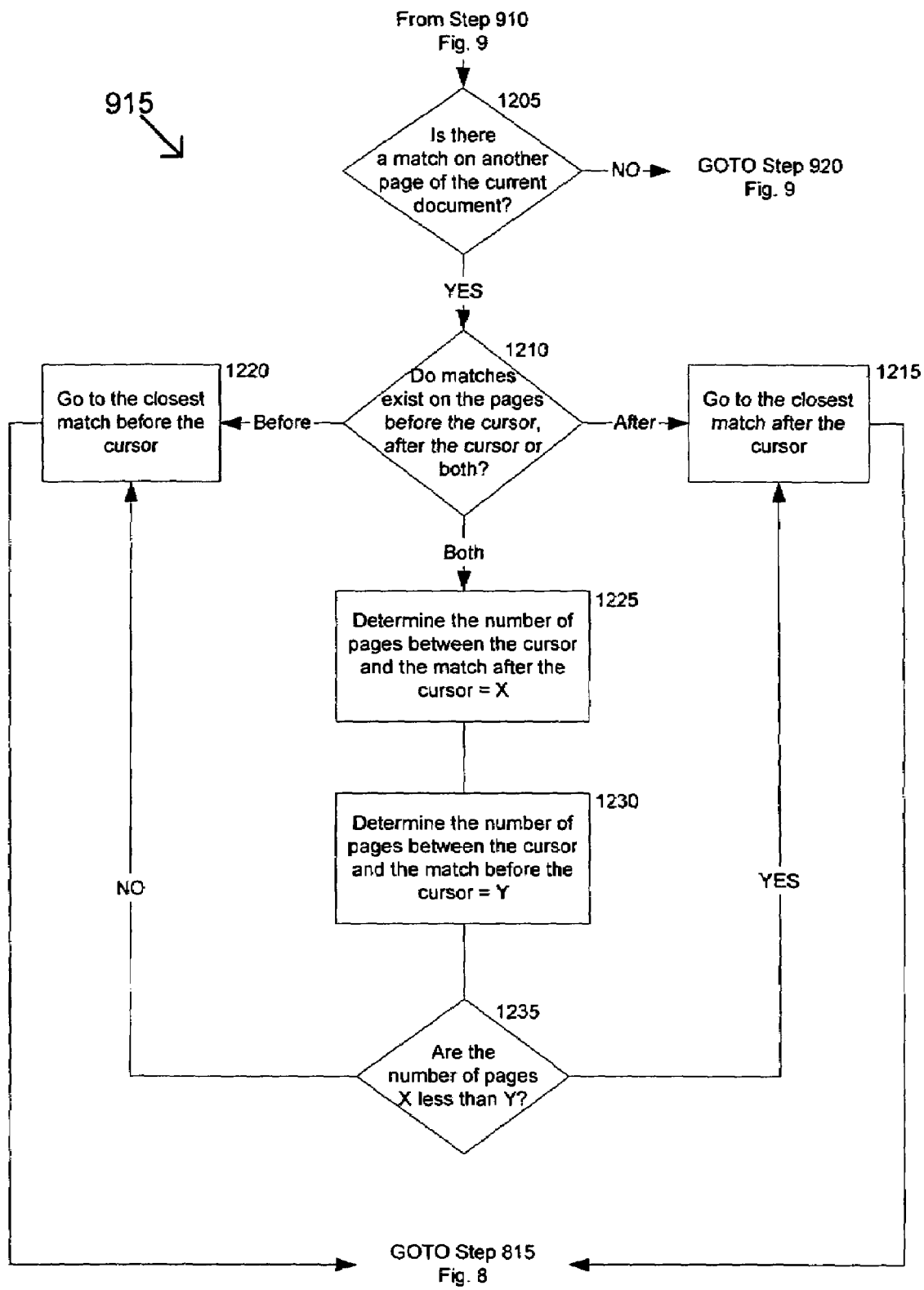
FIG. 12 is a flowchart illustrating an exemplary process for determining the nearest match to the cursor when multiple matches are in the document, but none of the matches are on the page the cursor is located.

FIG. 12 is a logical flowchart diagram illustrating an exemplary computer-implemented method for determining the nearest match to a cursor when multiple matches are located on other pages of the document as completed by step 915 of FIG. 9. Referencing FIGS. 1, 2, 9, and 12, the exemplary method 915 begins with an inquiry to determine if a match in the match list exists on pages other than the page containing the cursor in step 1205. If not, the "NO" branch is followed to step 920 of FIG. 9. Otherwise, the "YES" branch is followed to step 1210.

In step 1210, an inquiry is conducted to determine if matches on pages other that the page containing the cursor occur before the cursor, after the cursor, or both. If matches only occur before the cursor, the "Before" branch is followed to step 1220, where the navigation component 285 directs the DEM UI 250 to the closest match located on a page before the cursor. The process continues to step 815 of FIG. 8. If matches on pages other that the page containing the cursor only occur after the cursor, then the "After" branch is followed to step 1215, where the navigation component 285 directs the DEM UI 250 to the closest match located on a page after the cursor. The process continues to step 815 of FIG. 8. If the matches on pages other than the page containing the cursor occur both before and after the cursor, the "Both" branch is followed to step 1225.

In step 1225, the find manager 260 determines the number of pages between the cursor and the closest match after the cursor, which is set equal to X. The find manager 260 determines the number of pages between the cursor and the closest match before the cursor, which is set equal to Y in step 1230. In step 1235, an inquiry is conducted to determine if the number of pages for X is less than the number of pages for Y. If so, the "YES" branch is followed to step 1215, where the navigation component 285 directs the DEM UI 250 to the closest match after the cursor. Otherwise, the "NO" branch is followed to step 1220, where the navigation component 285 directs the DEM UI 250 to the closest match before the cursor.

Figure 13:
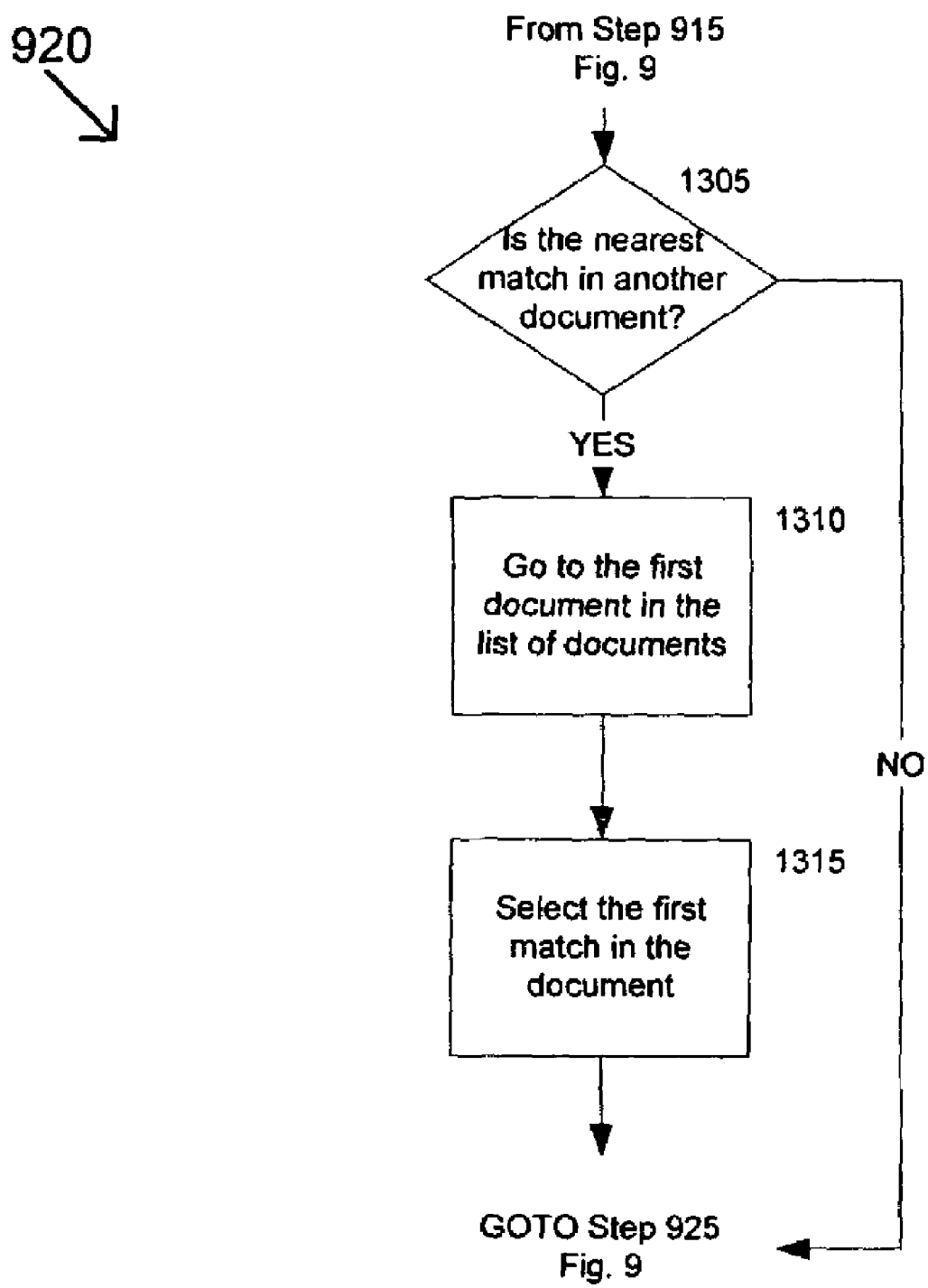
FIG. 13 is a flowchart illustrating an exemplary process for determining the nearest match to the cursor when multiple matches are in other documents but no match occurred in the document currently being viewed.

FIG. 13 is a logical flowchart diagram illustrating an exemplary computer-implemented method for determining the nearest match to the cursor in another document as completed by step 920 of FIG. 9. Referencing FIGS. 1, 2, 9, and 13, the exemplary method 920 begins with an inquiry by the find manager 260 determining if the nearest match to the cursor is located in another document in step 1305. If not, the "NO" branch is followed to step 925 of FIG. 9. Otherwise, the "YES" branch is followed to step 1310, where the navigation component 285 directs the DEM UI 250 to the first document in the list of documents searched by the search query. In step 1315, the selection manager 280 selects the first match from the first document. The process continues to step 925 of FIG. 9.

In conclusion, the present invention supports a computer-implemented method and system for finding matches to a search query in a document containing ink and text characters. The ink alternates search system can determine if the characters being searched are text or ink characters. The system can search through multiple alternates of the ink characters to determine if a match exists. The system can then organize the matches and select the match that is closest to the current location of the cursor.

It will be appreciated that the present invention fulfills the needs of the prior art described herein and meets the above-stated objectives. While there have been shown and described several exemplary embodiments of the present invention, it will be evident to those skilled the art that various modifications and changes may be made thereto without departing from the spirit and the scope of the present invention as set forth in the appended claims and equivalence thereof.

I claim:

1. A computer-implemented method of searching through ink characters within an electronic document comprising:

accepting, by a computer, a search query, where the search query comprises a search query word, a list of electronic documents, and at least one folder containing the electronic documents in the list of electronic documents wherein each document in the list of electronic documents comprises a plurality of text and ink words;

retrieving a search query character from the search query word in the search query;

accepting a word from the electronic document;

determining if the document word is an ink word, in response to determining that the document word is an ink word, conducting an ink word match, wherein conducting an ink word match comprises;

accepting an ink alternate word, wherein the ink alternate word is an estimation of the ink word, retrieving each of a plurality of ink alternate characters for the ink alternate word, determining, for each of the plurality of the ink alternate characters whether the each of the ink alternate characters matches the search query character, and returning a match list of each of the plurality of ink alternate character matches;

determining if the document character is a text word; and in response to determining that the document character is a text word, conducting a text word match;

adding a match to a match list in response to a positive determination that the search query word matches the set of characters in the electronic document; and processing a boolean operator in the search query, wherein the boolean operator satisfies a spatial relationship when the match to the first query word before the boolean operator and the match to the first query word after the boolean operator occur within a portion of the document currently displayed in a viewable area.

2. The computer implemented method of claim 1 further comprising:

accepting another ink alternate character for the ink alternate word in response to a positive determination that the ink alternate character matches the search query character;

accepting another search query character from the search query word;

determining when the other ink alternate character matches the other search query character;

determining when the other search query character is the last character in the search query word in response to a positive determination that the other ink alternate character matches the other search query character; and sending a match to the match list in response to a positive determination that the other search query character is the last character in the search query word.

3. The computer-implemented method of claim 1 further comprising:

determining when the search query contains another search query word;

retrieving a search query character of the other search query word in response to a positive determination that the search query contains the other search query word; and determining when the search query character of the other search query word matches the ink alternate character of the ink alternate word.

4. The computer-implemented method of claim 1 further comprising:

(a) accepting another ink alternate word in response to a determination that the ink alternate character does not match the search query character;

(b) retrieving an ink alternate character for the other ink alternate word;

(c) determining when the ink alternate character for the other ink alternate word matches the search query character; and (d) repeating steps a-c for a plurality of ink alternate words.

5. A computer-readable medium having computer-executable instructions for performing the steps recited in claim 1.

6. A computer-implemented method for searching within an electronic document comprising:

accepting, by a computer, a search query comprising a search query word to be sought in the electronic document, a list of electronic documents, and at least one folder containing the documents in the list of electronic documents wherein each document in the list of electronic documents comprises a plurality of text and ink characters;

determining when the search query word matches at least one set of characters in the electronic document comprising:

accepting the search query word from the search query;

retrieving one of a plurality of search query characters from the search query word, accepting a document content character from the electronic document, determining if the document character is an ink character;

in response to determining that the document character is an ink character, conducting an ink character match;

determining if the document character is a text character; and in response to determining that the document character is a text character, conducting a text character match;

adding a match to a match list in response to a positive determination that the search query word matches the set of characters in the electronic document;

processing a boolean operator in the search query;

determining when the match to the first query word before the boolean operator and the match to the first query word after the boolean operator satisfy a spatial relationship, the spatial relationship being satisfied when the match to the first query word before the boolean operator and the match to the first query word after the boolean operator occur within a portion of the document currently displayed in a viewable area; and displaying at least one match from the match list by highlighting the set of characters in the electronic document that correspond to the match of the search query.

7. The computer-implemented method of claim 6 further comprising:

(a) retrieving document content from the electronic document;

(b) accepting at least one document content character from the document content;

(c) determining when additional document content exists in the electronic document; and (d) repeating steps a-c for the additional document content.

8. The computer-implemented method of claim 6, wherein processing a boolean operator in the search query comprises:
- accepting the boolean operator from the search query;
- accepting a match to a first query word before the boolean operator from the match list;
- accepting a match to a first query word after the boolean operator from the match list;
- determining when the match to the first query word before the boolean operator and the match to the first query word after the boolean operator satisfy a spatial relationship; and
- removing from the match list the match to the first query word before the boolean operator and the match to the first query word after the boolean operator in response to a failure to satisfy the spatial relationship.

9. The computer-implemented method of claim 8, wherein the spatial relationship is satisfied when the match to the first query word before the boolean operator and the match to the first query word after the boolean operator occur within the same paragraph of the electronic document.

10. The computer-implemented method of claim 8, wherein the spatial relationship is satisfied when the match to the first query word before the boolean operator and the match to the first query word after the boolean operator occur within the same page of the electronic document.

11. The computer-implemented method of claim 6, wherein the step of displaying the matches further comprises:
- sorting the matches in the match list;
- identifying the match in the match list that is closest to a match point in the electronic document;
- navigating through the electronic document to the match closest to the match point; and
- selecting the match closest to the match point.

12. The computer-implemented method of claim 11, wherein the match point comprises the cursor location in the electronic document.

13. The computer-implemented method of claim 11, wherein sorting the matches comprises sorting the matches in the match list by the page number in which the match is located in the electronic document.

14. The computer-implemented method of claim 6 further comprising:
- (a) sorting a plurality of matches in the match list by page number in the electronic document;
- (b) accepting a first match and a second match from the match list;
- (c) determining when at least one character is between the document content characters corresponding to the first match and the second match in the electronic document;
- (d) merging the first match and the second match in the match list in response to a negative determination of at least one character between the document content characters corresponding to the first match and the second match;
- (e) retrieving a next match in the match list; and
- (f) repeating steps b-e for the plurality of matches in the match list.

15. The computer-implemented method of claim 6, wherein conducting a text character match comprises:
- comparing the document content character to the search query character to determine if the characters match;
- determining when the search query word contains additional characters in response to a positive determination that the search query character matches the document content character;
- retrieving another one of the search query characters in response to a positive determination that the search query word contains additional characters; and
- sending a match to the match list in response to a negative determination that the search query word contains additional characters.

16. The computer-implemented method of claim 15 further comprising:
- determining when the electronic document comprises a next document content character in response to a negative determination that the search query character matches the document content character;
- retrieving the next document content character in response to a positive determination that the electronic document comprises the next document content character; and
- comparing the search query character to the next document content character to determine when the characters match.

17. The computer implemented method of claim 16 further comprising:
- determining when the search query contains another search query word;
- retrieving a search query character of the other search query word in response to a positive determination that the search query contains the other search query word; and
- comparing the document content character to the search query character of the other search query word to determine if the characters match.

18. The computer-implemented method of claim 6, wherein conducting an ink character match comprises:
- (a) accepting an ink alternate word, wherein the ink alternate word is an estimation of the actual ink word received by the electronic document;
- (b) retrieving an ink alternate character for the ink alternate word;
- (c) determining when the ink alternate character matches the search query character;
- (d) accepting another ink alternate word in response to a determination that the ink alternate character does not match the search query character; and
- (e) repeating stages b-d for the other ink alternate word.

19. The computer implemented method of claim 18 further comprising:
- accepting another ink alternate character for the ink alternate word;
- accepting another search query character from the search query word;
- determining when the other ink alternate character matches the other search query character;
- determining when the other search query character is the last character in the search query word in response to a positive determination that the other ink alternate character matches the other search query character; and
- sending a match to the match list in response to a positive determination that the other search query character is the last character in the search query word.

20. The computer-implemented method of claim 18 further comprising:
- determining when the search query contains another search query word;
- retrieving a search query character of the other search query word in response to a positive determination that the search query contains the other search query word;
- determining when the search query character of the other search query word matches the ink alternate character of the ink alternate word.

21. The computer-implemented method of claim 6 further comprising:
- determining when the electronic document comprises additional document content characters;
- retrieving a next document content character in response to a positive determination that the electronic document comprises additional document content characters; and
- determining when the next document content character is an ink character or a text character.

22. A computer-readable medium having computer-executable instructions for performing the steps recited in claim 6.

23. A computer-readable medium which stores a set of instructions which when executed performs a method for providing ink alternates and plain text search, the method executed by the set of instructions comprising:
- accepting, in a computer, a search query comprising a search query word to be sought in the electronic document, a list of electronic documents, and at least one folder containing the electronic document wherein each electronic document in the list of electronic documents comprises a plurality of ink and text characters;
- determining when the search query word matches at least one set of characters in the electronic document, wherein the at least one set of characters is selected from the group consisting of an ink character and a text character, wherein determining when the search query word matches at least one set of characters in the list of electronic documents comprises:
  - accepting the search query word from the search query,
  - retrieving one of a plurality of search query characters from the search query word,
  - accepting a document content character from the electronic document,
  - determining if the document character is an ink character;
  - in response to determining that the document character is an ink character, conducting an ink character match;
  - determining if the document character is a text character; and
  - in response to determining that the document character is a text character, conducting a text character match;
- adding a match to a match list in response to a positive determination that the search query word matches the set of characters in the electronic document;
- sorting a plurality of matches in the match list;
- identifying a match in the match list that is closest to a match point in the electronic document;
- processing a boolean operator in the search query, wherein the boolean operator satisfies a spatial relationship when the match to the first query word before the boolean operator and the match to the first query word after the boolean operator occur within a portion of the document currently displayed in a viewable area; and
- highlighting the match closest to the match point.

24. The computer-readable medium having computer-readable instructions of claim 23, wherein the match point comprises the cursor location in the electronic document.

25. The computer-readable medium having computer-readable instructions of claim 23, wherein sorting the matches comprises sorting the matches in the match list by the page number in which the match is located in the electronic document.

26. The computer-readable medium having computer-readable instructions of claim 23, wherein the search query comprises at least two search query words, further comprising the step of processing a boolean operator in the search query.

27. The computer-readable medium having computer-readable instructions of claim 23, wherein processing a boolean operator in the search query comprises:
- accepting the boolean operator from the search query;
- accepting a match to a first query word before the boolean operator from the match list;
- accepting a match to a first query word after the boolean operator from the match list;
- determining when the match to the first query word before the boolean operator and the match to the first query word after the boolean operator satisfy a spatial relationship; and
- removing from the match list the match to the first query word before the boolean operator and the match to the first query word after the boolean operator in response to a failure to satisfy the spatial relationship.

* * * * *